(No Model.)
J. A. OLMSTED.
POWER EQUALIZING APPARATUS FOR CLOCKS.
No. 462,017. Patented Oct. 27, 1891.
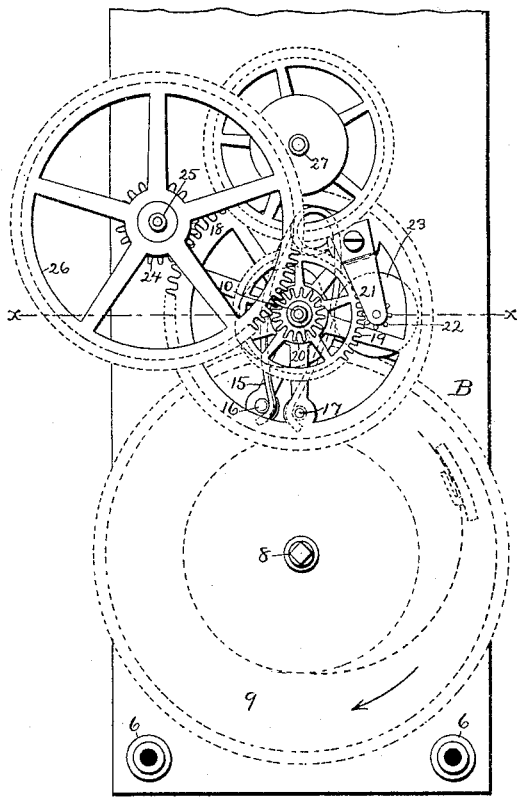
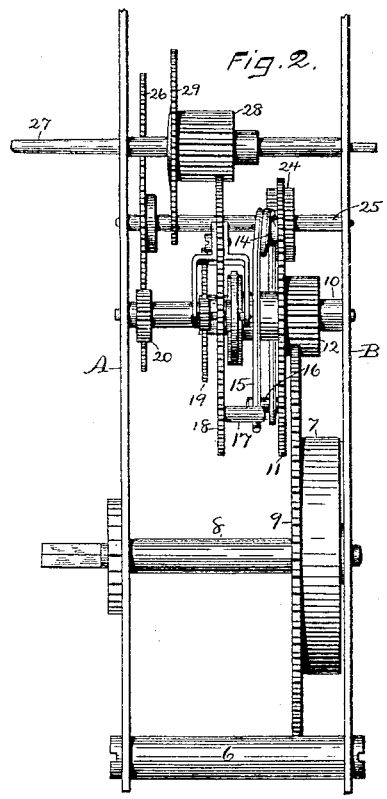
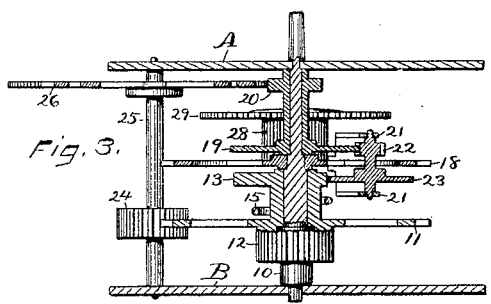
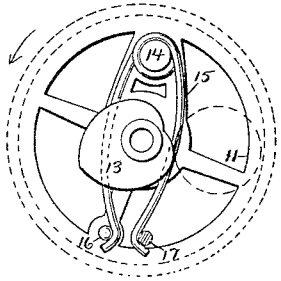
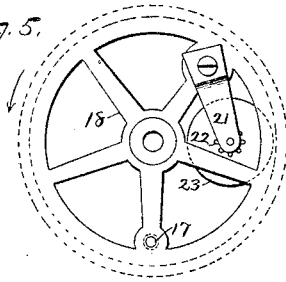
Witnesses:
John Edwards Jr.
E. V. Tracy
Inventor
Julius A. Olmsted.
By James Shepard.
Atty.

UNITED STATES PATENT OFFICE.

JULIUS A. OLMSTED, OF MERIDEN, CONNECTICUT, ASSIGNOR TO THE PARKER & WHIPPLE COMPANY, OF SAME PLACE.

POWER-EQUALIZING APPARATUS FOR CLOCKS.

SPECIFICATION forming part of Letters Patent No. 462,017, dated October 27, 1891.

Application filed March 16, 1891. Serial No. 385,212. (No model.)

*To all whom it may concern:*

Be it known that I, JULIUS A. OLMSTED, a citizen of the United States, residing at Meriden, in the county of New Haven and State of Connecticut, have invented certain new and useful Improvements in Clocks, of which the following is a specification.

My invention relates to improvements in clocks of the class known as "equalizing movements;" and the objects of my improvement are simplicity of construction, compactness in form, and general efficiency.

In the accompanying drawings, Figure 1 represents a front elevation of so much of a clock-movement as is necessary to illustrate my improvement, the front plate being removed and a portion of the teeth in the train being indicated by broken circles. Fig. 2 is a side elevation of the same portion of a clock, including the front plate. Fig. 3 is a horizontal section of the same on line $x\ x$ of Fig. 1, looking upwardly and showing the parts above said line. Fig. 4 is a detached front elevation of the rear one of the equalizing-wheels and equalizing-spring, and Fig. 5 is a like view of the other equalizing-wheel.

My invention is in the nature of an improvement upon the spring-motor patented to David Shive October 20, 1885, No. 328,724, and its general mode of operation is the same; but I dispense with the angle-lever employed in said patent for connecting the equalizing-wheels and I form an edge brake for the friction-disk instead of a side brake.

A designates the front plate, and B the rear plate, of the movement, the same being supported upon suitable pillars or posts 6 in any ordinary manner.

The spring 7, winding-shaft 8, and driving wheel or wheels 9 may be of any ordinary construction.

10 designates a shaft having its bearings in the front and rear plates. Loosely mounted upon this shaft toward its rear end is the driven wheel 11, having rigidly connected to it a driving-pinion 12 on its rear side and on its front side a hub provided with cam 13, all rigidly connected so as to loosely revolve on said shaft, said wheel being driven by the power-wheel 9, that engages said pinion 12.

This driven wheel 11 has a stud or post 14, about which the coils of a two-armed spring 15 are wound, and another pin or stud 16, against which one of the arms of said spring bear. The other arm of said spring bears upon a pin 17, that projects from the rear side of the yielding wheel 18.

The driven wheel 11 and yielding wheel 18 are both mounted upon the same shaft and are of the same size. The wheel 18 may be rigidly connected to the shaft 10, so as to revolve therewith, or it will operate the same if it is loosely revolved thereon while the shaft is stationary. Toward the front end of the shaft 10, in front of the yielding wheel 18, is a hub or sleeve containing at its rear end a wheel 19 and at its front end a pinion 20, whereby said wheel and pinion are rigidly connected together, but permitted to have an independent rotation on the shaft.

A compound or double bridge 21 is rigidly secured to the wheel 18 to form bearings for the shaft of the pinion 22 and friction-disk 23, the latter standing with its edge opposite the edge of the cam 13, while the pinion 22 is engaged and driven by the wheel 19. The wheel 19 is driven by the pinion 24 on the shaft 25, which pinion engages and is driven by the driven wheel 11. Upon this shaft 25 is a wheel 26, that engages with and drives the pinion 20.

The pinion 24, wheel 26, pinion 20, wheel 19, pinion 22, and friction-disk 23 constitute what I may term a "branch train," and the driven wheel 11, and yielding wheel 18, with intervening spring, are what may be termed "equalizing-wheels."

27 designates the center shaft, which revolves once an hour and which is driven by a pinion 28, that engages and receives its motion from the yielding wheel 18. It also carries the wheel 29, from which the power may be transmitted to the escapement-wheel of a clock in any ordinary manner, or in case the device is used as a mechanical movement the wheel 29 or wheel 18 may drive any desired wheels or train that may be connected therewith. The parts so driven may not differ from those ordinarily employed and are no part of the present invention, excepting as the mechanism herein shown is designed for driving other wheels.

The operation is as follows: When the mainspring exerts more power than is necessary to drive the mechanism lying beyond the yielding wheel, the spring 15 will yield and permit the driven wheel 11 to move faster than the yielding wheel 18, and meanwhile the mainspring or motor will also be driving the branch train and cause the disk 23 to revolve. As the spring 15 thus yields its two arms are brought nearer together. When the driven wheel 11 has gained upon the yielding wheel sufficiently to force the edge of the cam 13 against the edge of the friction-disk 23, as indicated in Fig. 4, in which the broken circle indicates the friction-disk, it will act as a brake and stop said branch train, and consequently stop all revolution of the driven wheel so long as said cam is pressed firmly against said disk. As shown, the cam 13 is heart-shaped; but only the lobe that comes in contact with said friction-disk has any function, and therefore the shape of the cam, aside from said lobe or eccentric, is immaterial. The driven wheel being stopped, the full force of the spring 15 will then be exerted upon the yielding wheel, so as to drive the pinion 28 and connected mechanism with only the force of the spring 15. As in the movement of the Shive patent before referred to, this spring is of about the proper strength to drive the desired mechanism. As soon as the spring-arms spread apart the disk 23, by its revolution around the axis of the wheel 18, will travel away from the cam 13, and thereby release said disk and permit the driven wheel and branch train to start again under the influence of the mainspring until the cam 13 by the faster movement of the driven wheel 11 again overtakes the disk and stops the branch train and driven wheel, as before described, and so on repeatedly so long as the power of the mainspring exerts a greater force upon the driven wheel than that of the spring 15 upon the wheels 11 and 18. When the power exerted upon the driven wheel 11 is substantially equal to the force of the spring between the equalizing-wheels, said two wheels will move along together the same as if they were one wheel.

I claim as my invention—

1. In a clock of the class described, the combination of a mainspring or motor, the driven wheel 11, having cam 13, the branch train terminating in the friction-disk 23, and the yielding wheel 18, driving a train mechanism and connected with the driven wheel 11 by means of the yielding spring, whereby the force of the principal motor when too great is checked by contact of the edges of said friction-disk and cam, substantially as described, and for the purpose specified.

2. In a clock of the class described, having two equalizing-wheels, the intermediate spring, and the brake or stop mechanism consisting of a friction-disk mounted on the yielding wheel and a cam eccentrically mounted on the hub of the driven wheel, substantially as described, and for the purpose specified.

3. The combination of a mainspring or motor, the shaft 10, driven wheel 11, having the cam 13 rigidly connected therewith, the pinion 24, wheel 26, pinion 20, and connecting-wheel 19, mounted to rotate independently on said shaft 10, the pinion 22, friction-disk 23, the yielding wheel 18 on said shaft and upon which wheel said friction-disk and pinion are mounted, mechanism connected with said wheel 18 and driven thereby, and a yielding spring between said driven and yielding wheels, substantially as described, and for the purpose specified.

JULIUS A. OLMSTED.

Witnesses:
A. M. LANE,
GEORGE W. SPRAGUE.